United States Patent [19]

Hinchey et al.

[11] Patent Number: 4,597,956

[45] Date of Patent: Jul. 1, 1986

[54] TREATMENT PROCESS FOR REMOVING FLUORIDE IMPURITIES FROM ALUMINOSILICATES

[75] Inventors: Richard J. Hinchey, Heemstede, Netherlands; Alexander J. Caglione, Nyack, N.Y.

[73] Assignee: Union Carbide Corporation, Danbury, Conn.

[21] Appl. No.: 707,804

[22] Filed: Mar. 4, 1985

Related U.S. Application Data

[63] Continuation-in-part of Ser. No. 509,604, Jun. 30, 1983, abandoned.

[51] Int. Cl.$^4$ .................... C01B 33/28; B01J 29/06
[52] U.S. Cl. .................... 423/328; 502/24; 502/64; 502/515; 502/516
[58] Field of Search .................... 423/118, 326–328, 423/111, 462, 464, 472, 489; 502/20, 24, 25, 60, 64, 85, 515, 516

[56] References Cited

U.S. PATENT DOCUMENTS

| | | | |
|---|---|---|---|
| 3,374,057 | 3/1968 | McDaniel et al. | 423/328 |
| 3,455,842 | 7/1969 | Cornelius et al. | 423/328 |
| 3,506,400 | 4/1970 | Eberly et al. | 423/328 |
| 3,594,331 | 7/1971 | Elliott | 252/442 |
| 3,691,099 | 9/1972 | Young | 252/450 |
| 3,933,893 | 1/1976 | Meyer et al. | 260/468.5 |
| 4,039,560 | 6/1978 | Kerr et al. | 252/455 |
| 4,238,243 | 12/1980 | Tu et al. | 423/328 |
| 4,247,527 | 1/1981 | Miyanohara et al. | 423/329 |
| 4,354,049 | 10/1982 | Ball et al. | 502/60 |
| 4,356,156 | 10/1982 | Dyer et al. | 423/328 |

FOREIGN PATENT DOCUMENTS 2828458 1/1980 Fed. Rep. of Germany .

OTHER PUBLICATIONS

J. Am. Chem. Soc., 58, 1695–7 (1936).
"Solubilities of Inorganic and Metal Organic Compounds" vol. I, 4th Ed., p. 184 (1958) D. Van Nostrand Col., Inc. Princeton.

*Primary Examiner*—Edward J. Meros
*Attorney, Agent, or Firm*—Gary Wamer

[57] ABSTRACT

The instant process relates to a process for treating fluoride-containing catalysts or aluminosilicates which contain insoluble fluoride compounds by the use of soluble aluminum compounds.

12 Claims, No Drawings

TREATMENT PROCESS FOR REMOVING FLUORIDE IMPURITIES FROM ALUMINOSILICATES

CROSS REFERENCE TO RELATED APPLICATION

This application is a continuation-in-part of U.S. Ser. No. 509,604, filed June 30, 1983, now abandoned.

FIELD OF THE INVENTION

The instant process relates to a process for treating fluoride-containing catalysts or fluoride containing aluminosilicates which contain insoluble fluorides.

BACKGROUND OF THE INVENTIONS

In recent years there has been substantial activity directed to the preparation of zeolitic aluminosilicates having higher $SiO_2$ to $Al_2O_3$ ratios than the previously known zeolitic aluminosilicates. Much of this activity has been in secondary treatment processes involving secondary treatment media. A review of some of the patent literature relating to this effort is instructive.

U.S. Pat. No. 3,691,099 discloses a dealuminization process where an aqueous acidic media and a water soluble salt are employed to extract framework aluminum atoms from crystalline zeolitic aluminosilicates.

U.S. Pat. No. 3,506,400 discloses a process similar to that of U.S. Pat. No. 3,691,099 except a pretreatment step is employed and an aluminum-chelating agent is employed.

U.S. Pat. No. 4,093,560 discloses a process for removing aluminum from a zeolite wherein a water-soluble acid is employed with an ammonium or alkali metal salt such that aluminum can be extracted from the zeolite by complexing. The mineral acid can be trifluoroacetic acid.

U.S. Pat. No. 3,594,331 discloses a method for increasing the thermal stability of crystalline zeolites by treating the zeolite with a dilute solution of a fluorine compound. The treatment with a fluorine compound is a fluoride treatment (column 3, line 41 et. seq.). After the fluoride treatment has been completed the zeolite (fluoride treated) incorporates 2 to 15 grams of fluoride per 10,000 grams of zeolite. The patent notes that excess fluoride actually decreases the thermal stability of the zeolite.

U.S. Pat. No. 3,933,983 discloses a fluoride treatment process similar to U.S. Pat. No. 3,594,331 except that an ion exchange step is added (see claim 1).

The dissolution of aluminum sodium fluoride ($Na_3AlF_6$) in aqueous solution with $Al_2(SO_4)_3$, $Al(NO_3)_3$ and $AlCl_3$ has been reported by F. J. Frere, *J. Am. Chem. Soc.*, 58, 1695-7 (1936) and by A. Seidell, "Solubilities of Inorganic and Metal Organic Compounds", Vol I, 4th Ed p. 184, (1958) D. Van Nostrand Co., Inc., Princeton, N.J.

The above processes are generally directed to only the extraction or removal of aluminum from a aluminosilicate zeolite. A process directed to the removal of aluminum and insertion of $SiO_4$ tetrahedra in the framework of the aluminosilicate is disclosed in copending U.S. Ser. No. 315,853, filed Oct. 28, 1982, now U.S. Pat. No. 4,503,023, commonly assigned and incorporated herein by reference thereto. This process inserts silicon atoms as $SiO_4$ tetrahedra by treating an aluminosilicate having a $SiO_2/Al_2O_3$ ratio of at least 3 with a fluoroaluminate salt in an amount of at least 0.0075 moles per 100 grams of the zeolitic aluminosilicate on an anhydrous basis, said fluorosilicate salt being in the form of an aqueous solution having a pH value within the range of 3 to about 7 and brought into contact with the zeolitic aluminosilicate at a rate sufficiently slow to preserve at least 60 percent of the crystallinity of the starting zeolitic aluminosilicate. The process relates to the preparation of numerous molecular sieves. Products prepared from zeolite Y are generally referred to in U.S. Ser. No. 315,853 as LZ-210. The final products are water washed but residual fluoride containing species generally require exhaustive wash treatment with water, ammonium acetate and boiling water.

In copending U.S. Ser. No. 509,604, filed June 30, 1983 a process is disclosed for treating fluoride-containing aluminosilicates to decrease the amount of fluoride contained therein by use of an effective amount of a solution of a soluble aluminum compound whereby the amount of insoluble fluoride compound associated with said aluminosilicate is decreased.

SUMMARY OF THE INVENTION

The instant process relates to a process for treating fluoride-containing catalysts which contain insoluble fluorides and comprises treating the fluoride-containing catalyst with a solution of at least one soluble aluminum salt.

DETAILED DESCRIPTION

It has been discovered that fluoride-containing catalysts and/or fluoride-containing aluminosilicates can be treated with water-soluble aluminum salts to remove insoluble fluoride compound(s) associated with the catalysts. The instant process will be discussed in reference to the treatment of catalysts, which discussion is meant to relate to the treatment of aluminosilicates. Preferably such catalysts also containing zeolitic aluminosilicates. The removal of such fluoride compounds is important in many instances if the catalyst is to be employed in many catalytic areas or if it is to be employed for an extended period of time, since the presence of such insoluble fluoride compounds in physical admixture with the aluminosilicate generally increases the rate of degradation of certain catalyst compounds, e.g., aluminosilicate compounds may degrade due to fluoride attack on the lattice. Further, such fluorides have a tendency to cause fluxing of inorganic materials under thermal or hydrothermal conditions which may destroy an aluminosilicates structure.

The term "fluoride" and/or "fluoride-containing" are used herein to refer to compounds which contain fluorine in a water insoluble form. Representative fluoro compounds include the various fluoroaluminate salts, e.g. alkali and alkaline earth salts of the form $M_3AlF_6$, $M_2AlF_5$, $MAlF_4$ where M is a cation, typically $NH_4^+$, alkali or alkaline earth metal cations. In addition, "fluoride" can mean $AlF_3$ and its hydrates. In general when the fluoride is an insoluble aluminum fluoride the ratio of F/Al is equal to or greater than 3. The term "soluble aluminum compound" is used herein to refer to aluminum compounds which are soluble in water or which can be solublized to some extent during the treatment of the catalyst. Representative soluble aluminum salts include aluminum sulfate, nitrate, halide, e.g., chloride, acetate and soluble organic salts and/or complexes of aluminum, and mixtures thereof. Compounds such as aluminum hydroxide may be employed by adding an acid to solubilize at least a portion of the aluminum hydroxide. The term "treating" is used according to its common meaning herein to mean the physical contacting of: (1) a solution or solid salt of the soluble aluminum compound; and (2) with the fluoride-containing catalyst. The salt of aluminum employed herein may will be provided in the form of a solution or added as a solid to a slurry of the fluoride-containing catalyst.

The instant process comprises treating a fluoride-containing catalyst with an effective amount of at least one soluble aluminum compound for an effective time and at an effective temperature such that the fluoride content of the catalyst is decreased. The present process provides for a decrease in the amount of wash solutions, e.g., water, required for effecting removal of the fluoride, as compared with washing with only water, which results in substantial savings in time and in the cost of production of such fluoride-containing catalysts. Further, the Na+ content of such catalysts have been observed to be lower than that achieved by use of simple treatment with water or aqueous ammonium solutions. In addition, the treatment is beneficial in decreasing the degradation of aluminosilicate components present in the catalyst.

The soluble aluminum compound is provided in an effective amount in a solvent, preferably water, in which it is preferably soluble in a molar amount greater than the solubility of the insoluble fluoride to be removed. The solvent may be any solvent in which the aluminum salt is soluble to the extent above noted and is preferably water or an alkanol in admixture with water. Water is the preferred solvent and the soluble aluminum salt(s) will preferably be a soluble sulfate, acetate or halide and is preferably aluminum sulfate.

The treating process of the instant invention is carried out at an effective temperature and for an effective period of time sufficient to decrease the amount of fluoride associated with the fluoride-containing catalyst but in all cases under the instant process this temperature and time and the amount of treating media (solvent and soluble aluminum compound) will be less than that employed when only the solvent is employed, i.e., when the solvent is employed in the absence of the soluble aluminum compound. Representative of effective treating temperatures are between about above the freezing point of the mixture and about 95° C. preferably between about 20° C. and about 95° C., more preferably between about 20° C. and about 75° C., it having been observed that at temperatures in excess of 95° C. that the removal of fluorides is diminished as compared with temperatures less than 95° C. Representative of the effective time is from minutes and to several hours or more.

The concentration of the soluble aluminum salt in relation to the fluoride-containing catalyst can vary depending on the fluoride concentration with the weight percent of soluble aluminum compound employable herein being from a few tenths of a weight percent up to a saturated solution. It has been found that if the concentration of the aluminum compound is correlated to the concentration of fluoride in the fluoride-containing catalyst to provide a mole ratio of fluoride to aluminum cation of less than 3, preferably between about 2 and about 2.5 that the removal of fluoride is markedly enhanced. Accordingly, such a correlation is preferred.

After the fluoride removal treatment with an effective amount of soluble aluminum salt has been carried out the amount of fluoride compound is less than amount originally contained in the catalyst and such amount is achieved at a rate which is faster than obtained when only solvent, e.g. water, is employed and, further, is achieved by use of significantly smaller amounts of treating solution than when only the solvent, e.g. water, is employed.

The instant process may be employed to treat aluminosilicates prepared according to the process described in copending U.S. Ser. No. 315,853, filed Oct. 28, 1982 and/or may be employed to treat catalysts prepared by fluoride treatments, such as disclosed in U.S. Ser. Nos. 659,641 and 657,413, both filed Oct. 3, 1984. The three aforementioned applications are incoporated herein by reference.

EXAMPLES

To demonstrate the improved rate of removal of fluorides from fluoride-containing catalysts a series of experiments were carried out on fluoride-containing catalysts using aqueous solutions of soluble aluminum compounds and by using for comparison only a water wash process.

The following examples were carried out to illustrate the instant invention and are not intended to be limiting in any way thereof.

EXAMPLES 1-5

To demonstrate the improved removal of insoluble fluoride compounds from fluoride-containing catalysts a preparation of LZ-210 was made following a procedure similar to that described in U.S. Ser. No. 315,853, filed Oct. 28, 1982. In these experiments the original ammonium exchanged Y zeolite material (NH$_4$Y) had the following anhydrous composition expressed as weight percent: SiO$_2$, 64.6; Al$_2$O$_3$, 22.4; Na$_2$O, 1.92; (NH$_4$)$_2$O, 9.5.

In a stainless steel vessel, equipped with an agitator, 25.6 lbs of the hydrated NH$_4$Y zeolite [28.3 percent LOI (Loss on Ignition) (at 1000° C.] was slurried in 79 lbs of water. In a separate vessel 8.4 lbs of technical grade ammonium silicofluoride [99% (NH$_4$)$_2$SiF$_6$], was dissolved in 32 lbs of water. The zeolite slurry was heated to 75° C. and the ammonium fluorosilicate solution was heated to 50° C. The fluorosilicate solution was then slowly and continuously added to the agitated zeolite slurry at the rate of approximately 100 grams of solution per minute over a period of about 3 hours. During this time the contents of both vessels were maintained at temperature by means of external electrical heating.

When the fluorosilicate addition was completed two (2) 1800 gram portions of the treated zeolite slurry were placed in separate 3 liter flasks equipped with stirrers. Two solutions of aluminum sulfate were then prepared by dissolving 345 gram samples of Al$_2$(SO$_4$)$_3$. 18H$_2$O in two 832 gram portions of water. These two solutions were then added to the two water slurries of LZ-210. One slurry was digested at 50° C. while the second slurry was digested at 95° C. Weighed portions of each slurry were taken and analyzed after treatment times of 2 hours and 24 hours. Each portion of slurry weighed about 931 grams and gave approximately 100 grams of anhydrous LZ-210 product. The LZ-210 products were filtered and washed with 1000 grams of water. Analysis of the four products are shown in Table I. For comparison the analytical data on a similarly prepared LZ-210 sample prior to either water washing or treatment with a soluble aluminum salt is shown in Table I as example 5.

It should be noted in Table I that digestion of the catalyst product with a soluble aluminum salt ($Al_2(SO_4)_3$) at 95° C. does not allow for the washing of the product substantially free of all fluoride-containing compounds. It is believed, but has not been conclusively demonstrated, that the fluoride residue in the product is not a fluoroaluminate salt but is rather an exchanged aluminum fluoride cation species such as $AlF_2^+$ or $AlF^{2+}$. When the extra-zeolite F/Al mole ratio of the system is reduced below 3 substantial concentrations of such species should be present in the liquor. It is likely that such species do not exchange readily with zeolitic cations at the lower temperature but do undergo activated exchange at higher temperatures. It is therefore important in the practice of this invention to carry out the treatment with soluble aluminum salts at a temperature less than about 95° C. and most preferably less than about 50° C. Still lower temperatures can, of course, be used but dissolution rates of insoluble fluoride salts would be expected to be slower at such lower temperatures.

It is generally observed that fluoro compounds result in zeolite crystal damage in LZ-210 zeolites as evidenced by loss of X-ray crystallinity, surface area and adsorption capacity and increased lattice vacancy formation as indicated by increased IR adsorbtion at 3710 $cm^{-1}$.

TABLE I

| Example | 1 | 2 | 3 | 4 | 5 |
|---|---|---|---|---|---|
| $Al_2(SO_4)_3$ Treatment | | | | | none |
| Time, hrs | 2 | 24 | 2 | 24 | — |
| Temp °C. | 50 | 50 | 95 | 95 | — |
| $H_2O$ wash: (weight/weight) | 10 | 10 | 10 | 10 | none |
| Chemical Analysis, wt %* | | | | | |
| $SiO_2$ | 81.5 | 81.9 | 77.3 | 75.1 | 63.9 |
| $Al_2O_3$ | 12.9 | 13.14 | 19.2 | 21.7 | 21.6 |
| $Na_2O$ | 0.33 | 0.45 | 0.41 | 0.3 | 2.636 |
| $(NH_4)_2O$ | 4.9 | 4.8 | 4.1 | 3.8 | 17.6 |
| $F^-$ | 0.32 | 0.24 | 5.7 | 7.8 | 26.65 |
| Molar $SiO_2/Al_2O_3$ | 10.7 | 10.6 | 6.8 | 5.9 | 5.0 |
| Adsorption Capacity, wt. % | | | | | |
| Oxygen** | 31.8 | 31.7 | 29.1 | 27.4 | 22.1 |
| Water*** | 27.9 | 29.0 | 27.2 | 24.3 | 16.1 |
| DTA Peak, °C. | 1110 | 1105 | — | 740 | — |
| X-Ray Crystallinity, % | 121 | 109 | 98 | 108 | — |
| Nitrogen Surface Area, $M^2/g$ | 841 | 850 | 420 | 730 | 353 |
| Unit Cell size, $a_o$ | 24.49 | — | 24.48 | 24.4 | 24 |

*Anhydrous basis
**Measured at 100 mm Hg, -183° C.
***Measured at 4.6 mm Hg, -25° C.

EXAMPLES 5 to 10

To demonstrate the advantages derived by the use of soluble aluminum salts in the removal of residual fluoride or fluoride-containing compounds present in the zeolite product LZ-210 as a result of the use of aluminum fluorosilicate solutions in the preparation of LZ-210, examples 1-4 were duplicated herein using the same equipment and procedures. Example 5 is a comparative example similarly prepared but was not treated with an aluminum compound. On an anhydrous basis the starting Y zeolite (ammonium form) had the following chemical composition: $SiO_2$, 65.0 percent; $Al_2O_3$, 22.2 percent; $(NH_4)_2O$, 9.6 percent; an $Na_2O$, 2.56 percent.

The LZ-210 employed in the examples was prepared by forming a slurry of the Y zeolite by mixing 25.1 lbs of the ammonium form ($NH_4Y$), having a 28.1 percent LOI at 1000° C., with 65 lbs of water. In a separate vessel a solution of 7.8 lbs $(NH_4)_2SiF_6$ was dissolved in 31.2 lbs of $H_2O$ and heated to 50° C. This slurry was heated to 75° C. with agitation. To this slurry was added the ammonium fluorosilicate solution at a rate of 100 g solution per minute by means of a small adjustable laboratory pump. Total addition time for the fluorosilicate solution was about three (3) hours. At the end of the three (3) hour period the mixture was cooled to 50° C. and homogeneous samples of about equal size of the LZ-210 slurry were taken from the bulk mixture and treated separately with solutions of the following compounds: fifteen wt % aqueous solutions of $Al_2(SO_4)_3 \cdot 18H_2O$, $Al(NO_3)_3 \cdot 3H_2O$ and $AlCl_3 \cdot 6H_2O$; and $Al_2O_3 \cdot 3H_2O$ (crystalline gibbsite). In addition a sample (example 5) was not treated with an aluminum compound for comparison purposes.

Each slurry sample, prior to washing with water or treatment with the solution of soluble aluminum compound, weighed about 645 grams (g) and contained about 100 g of LZ-210 product (anhydrous basis). The following weights of each aluminum compound were added to each slurry:

| Aluminum Compound | Weight |
|---|---|
| $Al(NO_3)_3 \cdot 3H_2O$ | 141.4 g |
| $AlCl_3 \cdot 6H_2O$ | 91.0 g |
| $Al_2O_3 \cdot 3H_2O$ | 29.4 g |
| $Al_2(SO_4)_3 \cdot 18H_2O$ | 125.6 g in 304 g $H_2O$ |

Each slurry was then maintained at 50° C. for two hours to permit equilibration. The solids were then filtered either on a Buchner funnel or a filter press and washed with water at a weight ratio of 10:1 (water to solids), dried and analyzed. As a control, one 645 g sample (example 6) of the LZ-210 slurry was not treated but was filtered after preparation directly and washed with the same quantity of water employed for the other examples.

In examples 6 to 10 the amount of the aluminum compound added were sufficient to give a F/Al (fluoride to aluminum) mole ratio of 2.2 based on all non-framework aluminum, i.e., aluminum that is not retained in the LZ-210 zeolite lattice. Thus, the total non-framework aluminum is taken as equal to the sum of the moles of $(NH_4)_3AlF_6$ (formed by the stoichiometric reaction of $(NH_4)_2SiF_6$ with aluminum extracted from the starting Y zeolite) and the aluminum compound added in the treating step.

The analytical data for examples 6 to 10 are set forth in Table II. The data show that the LZ-210 samples which had been treated with the aluminum compounds gave a higher DTA Collapse temperature. This higher DTA temperature indicates that the treated samples were more thermally stable with collapse of the lattice occurring at a higher temperature.

As is readily apparent from the data set forth in Table II, the aqueous solution of aluminum salts, i.e., chloride, nitrate and sulfate, were more effective in the removal of residual F as compared with the same amount of water at comparable washing conditions. Use of a crystalline aluminum hydroxide, $Al_2O_3 \cdot 3H_2O$, was no more effective than washing with water over the commercially practical short treatment period employed. The DTA (Differential Thermal Analysis) exotherm for crystal collapse occured at a much lower temperature for the water washed LZ-210 (772° C.) than for LZ-210 samples washed with solutions of soluble aluminum salts showing the deleterious effect of the 3.6 weight percent of the residual fluoride on the thermal stability of the catalyst LZ-210.

TABLE II[1]

| Example | 6 | 7 | 8 | 9 | 10 |
|---|---|---|---|---|---|
| $Si/Al_2$ | 10.1 | 10.8 | 10.7 | 10.8 | 4.4 |
| $SiO_2$ | 77.2 | 79.7 | 81.1 | 81.5 | 66.7 |
| $Al_2O_3$ | 13.0 | 12.5 | 12.9 | 12.8 | 25.9 |
| $(NH_4)_2O$ | 7.2 | 5.4 | 4.2 | 4.4 | 6.3 |
| $Na_2O$ | 0.8 | 0.4 | 0.3 | 0.3 | 0.6 |
| $F^-$ | 3.6 | 0.4 | 0.4 | 0.3 | 3.2 |
| $F/Al$[3] | 6 | 2.2 | 2.2 | 2.2 | 2.2 |
| Cation Bal. | 1.19 | 0.9 | 0.68 | 0.70 | 0.51 |
| $O_2$ Capacity[2] | 29.6 | 31.6 | 30.2 | 30.2 | 24.7 |
| Treat. Time (°C.)[4] | 50 | 50 | 50 | 50 | 50 |
| Treat. Time (hr)[4] | 2.0 | 2.0 | 2.0 | 2.0 | 2.0 |
| Aluminum Cpd. | none | $Al_2(SO_4)$ | $Al(NO_3)_3$ | $AlCl_3$ | $Al_2O_3 \cdot 3H_2O$ |
| DTA (collapse) | 772 | 1127 | 1097 | 1101 | — |

[1]$SiO_2$, $Al_2O_3$, $(NH_4)_2O$, $Na_2O$ and $F^-$ are given on a weight percent (anhydrous) basis and the ratios of $Si/Al_2$ and $F/Al$ are given on a mole basis.
[2]$O_2$ capacity calculated as in U.S. Ser. No. 315,853 filed October 28, 1982.
[3]Fluoride ($F^-$) to aluminum (Al) mole ratio.
[4]Time and temperature employed for wash step with water or with solution of aluminum compound.

What is claimed is:

1. The process for treating fluoride-containing aluminosilicates to decrease the amount of insoluble fluoride compounds contained therein comprising treating said fluoride-containing aluminosilicate with an effective amount of a solution of a soluble aluminum compound at an effective temperature and for an effective time whereby the amount of insoluble fluoride compounds associated with said aluminosilicate is decreased.

2. The process of claim 1 wherein said aluminosilicate has been prepared by inserting silicon atoms as $SiO_4$ tetrahedra into the crystal lattice of a crystalline aluminosilicate having a $SiO_2/Al_2O_3$ molar ratio of at least 3 and pore diameters of at least 3 Angstroms by contacting said aluminosilicate with a fluorosilicate salt in an amount of at least 0.0075 moles per 100 grams of the aluminosilicate on an anhydrous basis, said fluorosilicate salt being in the form of an aqueous solution having a pH value within the range of 3 to about 7 and brought into contact with the aluminosilicate at a rate sufficiently slow to preserve at least 60 percent of the crystallinity of the starting aluminosilicate.

3. The process of claim 1 wherein the effective temperature is between about 20° C. and about 95° C.

4. The process of claim 3 wherein the effective temperature is between about 20° C. and about 75° C.

5. The process of claim 1 wherein the fluoride is a fluoroaluminate.

6. The process of claim 1 wherein the soluble aluminum compound is at least one of aluminum sulfate, aluminum nitrate, aluminum chloride, organic salts and complexes of aluminum, aluminum hydroxide and mixtures thereof.

7. The process of claim 6 wherein the soluble aluminum compound is provided as a water solution.

8. The process of claim 7 whereby the fluoride compounds are removed at a rate greater than that obtained by the use of water without the soluble aluminum compounds.

9. The process of claim 1 wherein the mole ratio of fluoride to aluminum cation in the treatment is less than 3.

10. The process of claim 9 wherein the mole ratio of fluoride to aluminum cation in the treatment is between about 2.0 and about 2.5.

11. The process of claim 1 wherein said aluminosilicate comprises a component of a fluoride-containing catalyst.

12. The process of claim 2 wherein said aluminosilicate comprises a component of a fluoride-containing catalyst.

* * * * *